Oct. 17, 1961 H. HACK 3,004,666
STATIC TESTING AND MASS-BALANCING APPARATUS
FOR CONNECTING RODS AND THE LIKE
Filed July 11, 1955 3 Sheets-Sheet 3

Inventor:
Heinrich Hack.

United States Patent Office 3,004,666
Patented Oct. 17, 1961

3,004,666
STATIC TESTING AND MASS-BALANCING APPARATUS FOR CONNECTING RODS AND THE LIKE
Heinrich Hack, Gross Zimmern, near Darmstadt, Germany, assignor to Carl Schenk Maschinenfabrik, Darmstadt, Germany, a corporation of Germany
Filed July 11, 1955, Ser. No. 521,155
8 Claims. (Cl. 209—121)

This invention is concerned with a static testing and mass-balancing apparatus for connecting rods and the like, that is, with a machine for statically testing structurally similar movable machine parts as to the uniformity of the distribution of the mass thereof and to eliminate ascertained deviations by compensation, correction or balancing of the mass of such parts.

The static testing and balancing apparatus according to the invention ascertains automatically the weight and center of gravity position of the parts or bodies noted above; automatically eliminates deviations from desired magnitudes of both values; and by a final checking separates bodies that are free of faults from those that may have retained a faulty condition. A positioning device forming part of the apparatus moves the parts or bodies to be tested automatically from station to station in step with the testing operations and the working or balancing operations to be performed. The feed and discharge of the parts may be coupled with the apparatus and may be controlled thereby. Entirely uniform and mutually exchangeable parts are in this manner obtained for further processing or use, by automatic operations effected in one and the same machine. The complete automation of uniformity testing and balancing of the parts saves time and labor.

Weighing devices are employed for determining the weight proportions and position of the centers of gravity of the parts. In known weighing devices or scales for testing and sorting connecting rods, the rods are disposed upon knife edges extending exactly through the center of the piston pin bore, for measuring the amount of the oscillating mass or proportional weight, and also through the center of the crank pin bore, for measuring the rotating mass or proportional weight, respectively. However, the points at which a mass compensation might have to be effected usually do not coincide with the measuring plane extending through the bore centers. Milling or similar working of the parts will practically effect compensation or balancing, for example, only at the extreme ends of the rods. However, if such balancing were carried out in accordance with excess weights ascertained at the bore centers, a residual mass moment would remain after the balancing operation.

In the balancing apparatus according to the invention, the connecting rods or like parts or bodies are disposed upon scales or weighing bridges in such a manner that measured excess weights are directly referred to the compensation points, that is, noncompensated residual moments are with certainty avoided upon completion of the operation. In order to eliminate erroneous measurements, the supporting knife edges for the parts to be tested are in the weighing device arranged so high that they lie within the longitudinal median plane of the corresponding parts. The automatic balancing operation is made possible by causing the weighing device to transmit electrical control impulses and by coupling it, preferably electrically, with a correction device, to effect responses to deviations from the desired weight, actuation of stepping means which are thereafter automatically switched to the correction device for the purpose of controlling the balancing operation thereof.

In accordance with the invention, a mechanical frame may be employed with the weighing device, for receiving the part or body to be tested, such frame being constructed so that the weight deviations ascertained by the weighing device and therewith the number of electrical impulses transmitted by the weighing device to one or more step-by-step mechanisms are always directly referred to the compensation points of the body to be tested.

Another object and feature of the invention resides in the provision of an electrical transmission circuit disposed between a device for transmitting current impulses for weight- or weight proportion determination and one or more stepping devices, said circuit being arranged so that the number of current impulses transmitted to the stepping device or devices is directly referred to the compensation points of the body or part being tested.

The positioning device may cooperate with a device for feeding to the apparatus parts to be tested.

The checking control device may in accordance with the invention be arranged so as to control the operation of a device for discriminating between and segregating faulty from fault-free parts.

The above indicated and other objects and features of the invention will appear from the description which will be rendered below with reference to the accompanying diagrammatic drawings. In these drawings, FIG. 1 shows an embodiment of the new machine in elevational side view;

Figure 1:
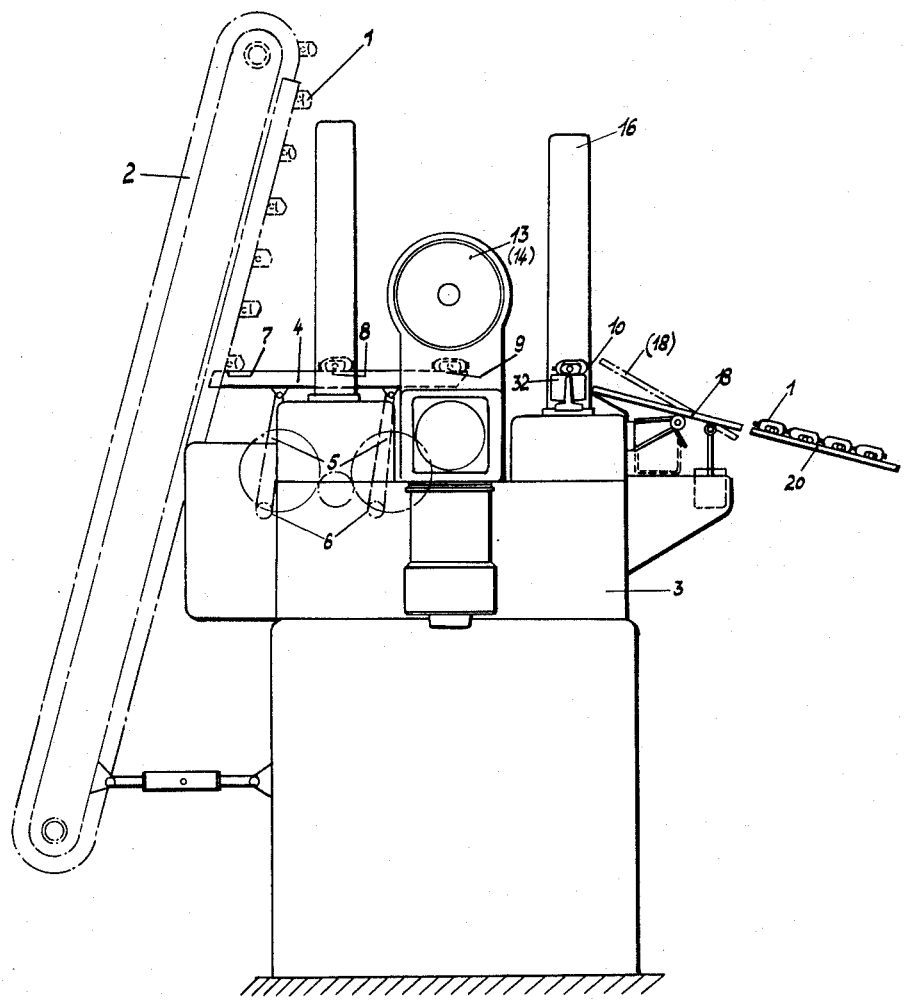

The parts to be tested and if need be, compensated, corrected or balanced, for example, connecting rods 1, are delivered to the machine 3 comprising measuring, compensating or balancing and control or checking stations, by means of an adjustable magazine conveyor 2. A positioning device is provided for moving connecting rods to be processed relative to the individual receiving, measuring, compensating or balancing, and controlling and checking stations. This positioning device removes the connecting rods individually from the conveyor magazine and moves them successively to the serially related work or processing stations. In the illustrated example, the positioning device comprises a tablelike part 4 disposed upon guide links 5 actuated by a crank drive mechanism 6 which may be operated by suitable known (not illustrated) drive means. The drive means moves the table 4 from the left into the illustrated position, for receiving at the station 7 a connecting rod 1 from one of the magazines of the feeder conveyor 2, as well as for receiving connecting rods which may at such time be positioned at station 8 (measuring) and station 9 (balancing), respectively. The various connecting rods are respectively received by the table 4 due to the upward movement of the table which causes it to lift the connecting rods from their respective supports. Further rotation of the drive means moves the table into its right hand terminal position (FIG. 1) in which the respective connecting rods are deposited upon supports in the respectively successive stations. All connecting rods are in this manner each advanced by one station, that is, the connecting rod removed from its magazine or holder is moved to measuring position or station 8, the measured connecting rod is moved to compensating or balancing position or station 9, and the balanced connecting rod is moved into the control or checking position or station 10.

Figure 4:
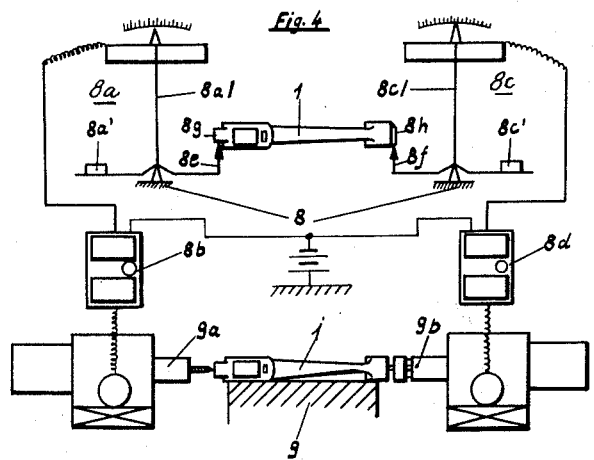

The measuring in position 8 is effected by two automatic indicating weighing scales 8a, 8c (FIG. 2) having respective indicator indicating pointers denoted by 8a1 and 8c1 (FIG. 4). These scales determine the partial weights of the crank and piston pin portions, respectively, of the connecting rod work pieces and convert deviations from the values of the check or control weights 8a' and 8c' into a number of electrical impulses which are respectively registered in or by impulse storage means, for example, by stepping mechanisms 8b and 8d.

In the second station 9, which is the compensating or balancing station, the connecting rod coming from station 8 is first by suitable means automatically clamped in position. A machine tool 13, 14 comprising one or more tools, for example, drills 9a and 9b (FIG. 2) is thereupon actuated to effect upon predetermined portions of the connecting rod compensation or correction operations in accordance with impulses derived from the storage or control devices 8b and 8d to balance the rod. During the transfer of the connecting rod from station 8 to station 9, the storage means 8b and 8d are, preferably automatically, disconnected from the scales 8a and 8c and instead connected to the controls for the machine tool or tools so as to control the operation thereof in accordance with their setting as determined by the scales. Suitable impulse producing controls for the machine tools are known to those skilled in the art and are described in my U.S. Patent No. 2,682,046, issued June 22, 1954 and also in my copending application Serial No. 238,649, now U.S. Patent No. 2,810,307, issued October 22, 1957. Since these controls are not claimed herein per se, and a detailed description thereof is not necessary for an understanding of the present invention, such detailed description of these controls is not included here.

Another connecting rod has at the same time been removed by the table from the corresponding magazine of the feeder conveyor 2 and has been deposited at the station 8. While the connecting rod at station 9 is being machined as described, the connecting rod at station 8 is being measured and the corresponding ascertained values are recorded in another pair of storage devices such as 8b' and 8d' (see FIG. 2) in a manner similar to that described in connection with the storage devices 8b and 8d. The successive third operation step moves the connecting rod from station 8 to station 9, moves the one from station 9 to the control or checking station 10, and another connecting rod to be processed is again taken by table 4 at station 7 from a magazine or holder of the conveyor 2 and deposited at station 8.

Figure 5:
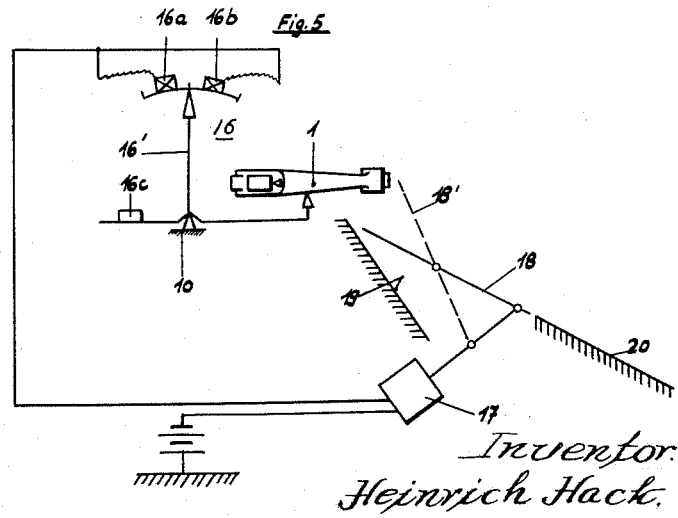

At the control or checking station 10, there is provided a weighing scale 16 having a pointer 16' (FIG. 5) adapted to cooperate with contacts 16a, 16b, for producing an impulse when the weight of the tested and balanced connecting rod 1 deviates upwardly or downwardly from a permissible tolerance value of the control weight 16c. This impulse actuates a sorting device, for example, a discharge chute flap 18 (FIGS. 2, 5), by operation of suitable means, for example, an electromagnet 17, placing the flap 18 into the dotted line position 18' (FIG. 5) so as to discharge each defective connecting rod by way of an inclined reject chute 19. The flap 18 remains in its normal full line position in the absence of an impulse from the scale 16. A suitable timing device is provided for actuating with a delay of about 2 seconds, pending the quieting of the scale 16', a magnet or like which causes rocking of the checking or control weigher bridge about the axis 32 (FIG. 1) to effect sliding of the checked connecting rod upon the flap 18 and from there either along the discharge chute 19 for defective rods or along a conveyor belt 20 for rods fee from deflects.

The motions of the conveyor 2 and the crank drive 6 for the positioning table 4 are synchronized so as to secure continuous operational interplay of these parts to provide for flowing working cycles. The signals for the operational rhythm may be effected automatically by suitable circuit means depending upon the operation requiring the longest time interval.

The weighers or scales 8a and 8c may, if desired, indicate deviations of the weights of the crank pin and the piston pin ends of the connecting rods from the predetermined weights. In FIG. 4, the connecting rod 1 is shown resting with its marginal portions 8g and 8h, at which correction operations are to be effected, upon knife edges 8e and 8f. This may be structurally realized, for example, by positioning the connecting rod in a suitable frame having openings facing the knife edges. The supporting portions of the knife edges 8e and 8f are in this manner placed at a level coinciding with the median plane of the connecting rod, as is necessary for exact measuring.

Figure 2:
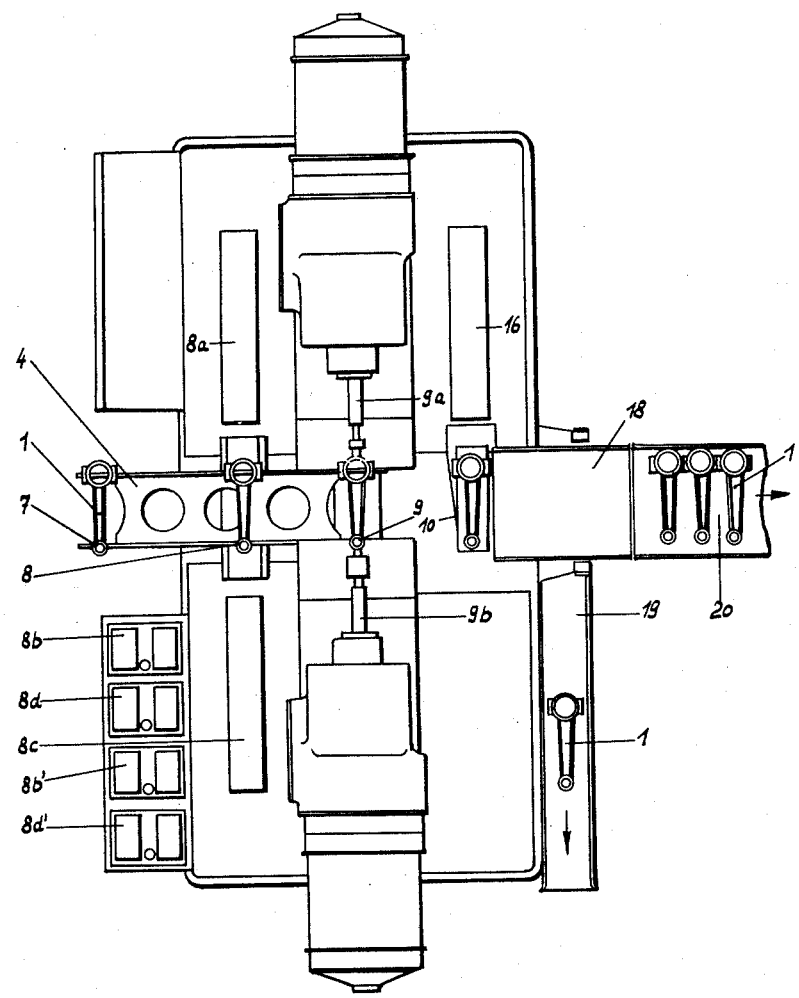
FIG. 2 shows an elevational top view of the machine.
Figure 3:
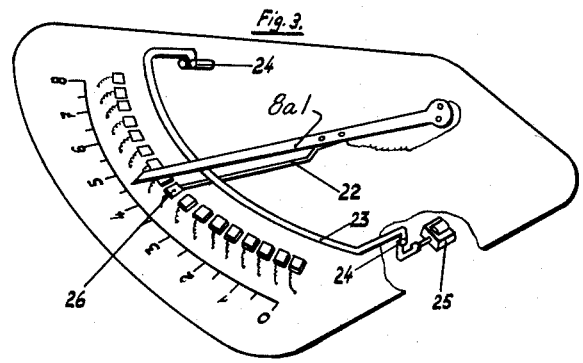
FIGS. 3 and 5 illustrate in schematic representation control devices and operations for the mass-uniformity testing and balancing.

The conversion of any ascertained deviation into a corresponding number of electrical impulses may be effected, for example, by providing the pointer of each scale such as the pointer 8a1, with a contact spring 22, as shown in FIG. 3, an arcuate bracket 23 rotatably journalled at 24 extending between the pointer 8a1 and the spring 22. An electromagnet 25 may be provided, controlled by a suitable timing device, for actuating the bracket 23 after the lapse of a delay interval, giving time for the pointer 8a1 to come to rest after completion of the weighing, thereby pressing the spring 22 against a contact such as 26 which coincides with the corresponding pointer position. These contacts 26 are connected with respectively cooperating stepping devices 8b or 8b' and 8d or 8d' (FIGS. 2, 4). Each contact 26 is connected with a corresponding contact at the stepping device and the latter is caused to execute a number of steps corresponding to the setting of the scale pointer 8a1 as soon as the spring 22 closes the associated circuit.

The contacts 26 may be disposed in a row as shown in FIG. 3, or may be staggered, depending on the weight tolerance that may be required.

Upon conclusion of the weighing operation and delivery of the connecting rod to the machining station 9, the stepping device is connected to such station and the compensation tools 9a, 9b (FIGS. 2, 4) will go into action automatically. As soon as the tools start their compensating or balancing operation, the stepping device which has now been connected thereto will start to operate. Upon reaching its home or zero position, the stepping device will interrupt the compensating or balancing operation and will cause the return of the tools into their initial position. The required balancing or correcting operation of the tools 9a and/or 9b is thus effected at station 9 under automatic control and in accordance with the results required by the measuring operation.

An electrical circuit may take the place of the above-mentioned frame upon the knife edges 8e and 8f. In such case, the knife edges 8e and 8f will extend through the centers of the connecting rod bores and the scales will measure the predetermined desired weights with reference to the bore centers. The electrical circuit will operate so that the impulse values transmitted to the storing devices correspond to the deviations with reference to the compensating points.

In some cases, for example, in the case of pistons, as the workpieces, only the total weight will be measured. The three stations as they are used in the case of connecting rods will otherwise remain the same.

The arrangement according to the invention may also be used for controlling more than two weight components. For example, in the case of disklike bodies, plates and the like, a three-point weighing may be effected instead of the described two-point weighing, with supporting engagement of the bodies upon the scales, the ascertained values of which will be determined for the position of the center of gravity in two coordinate directions. Successive weighing operations would make it in similar manner possible to measure and to correct the spatial position of the center of gravity.

Many advantages are obtained by the machine according to the invention, among the more important of which are: (a) the continuous automatic testing, measuring and correction of the mass distribution of articles undergoing testing; (b) exclusion of all possibilities of confusion regarding the article undergoing testing and the corrections appropriate therefor; and (c) the automatic and positive separation of defective articles and discharge thereof, thereby obtaining with certainty bodies which are mutually interchangeable.

Those skilled in the art, upon a study of this disclosure, will recognize that the invention, especially as regards the components of the above-described machinery and apparatus, permits of various modifications and may be embodied in devices of a design and arrangement other than as specifically illustrated and described.

I claim:

1. An automatically operating mass-balancing machine for testing and compensating the distribution of mass in individual articles, comprising a first and a second and a third station, means for supplying one of said articles to said first station while simultaneously removing an article from said first station and moving it to said second station and coincidently removing an article from said second station and moving it to said third station, load sensing means at said first station for determining the relative load distribution at predetermined spaced portions of the article supplied thereto, means at said second station for correcting the load distribution of the article received from said first station in response to occurrence of an undesired load distribution at said first station, means at said third station for checking said relative load distribution in the article received from said second station, and means cooperating with said third station for discharging articles checked at said third station.

2. A machine according to claim 1, wherein said discharging means comprises control means for segregating defective articles from fault-free articles and separately discharging the respective articles, said control means being operably connected with said checking means at said third station for governing the operation of said segregating means.

3. A machine according to claim 1, including pulse transmitter means controlled by said load sensing means for producing control impulses corresponding to relative load deviations ascertained by said load sensing means, pulse storing means connecting said pulse transmitter means with said correcting means for controlling the operation of said correcting means at said second station in accordance with said pulses.

4. A machine according to claim 3, said load sensing means comprising scale means, said pulse transmitter means for producing control impulses comprising a pointer operably connected with said scale means for movement thereby, a plurality of stationary contacts, said pointer being movable relative to said stationary contacts, and contact means movable with said pointer for selective engagement with said stationary contacts.

5. A machine according to claim 4, said scale means including means for supporting the article delivered thereto at said predetermined spaced portions thereof to determine weight discrepancies at said portions.

6. A machine according to claim 5, comprising tool means at said second station under control of said pulse storing means for machining said portions of said article to correct the mass distribution thereof.

7. A machine according to claim 4, said article comprising an elongated body, and said scale means including knife-edge means for supporting said body at the opposite ends thereof at said predetermined spaced portions, the axes of said knife-edge means being disposed along planes intersecting the longitudinal axis of said body.

8. A machine according to claim 3, comprising circuit means extending from said pulse storing means for transmitting said impulses to said second station for controlling the operation of said correcting means.

References Cited in the file of this patent

UNITED STATES PATENTS

| | | |
|---|---|---|
| 2,116,895 | Howard | May 10, 1938 |
| 2,612,995 | Kahle et al. | Oct. 7, 1952 |
| 2,664,557 | Sargrove | Dec. 29, 1953 |
| 2,690,702 | Romans | Oct. 5, 1954 |
| 2,694,960 | Kahle et al. | Nov. 23, 1954 |
| 2,712,408 | Weber | July 5, 1955 |
| 2,802,658 | Hengsen | Aug. 13, 1957 |
| 2,810,307 | Hack | Oct. 22, 1957 |

UNITED STATES PATENT OFFICE
CERTIFICATION OF CORRECTION

Patent No. 3,004,666                      October 17, 1961

Heinrich Hack

It is hereby certified that error appears in the above numbered patent requiring correction and that the said Letters Patent should read as corrected below.

In the headings to the three sheets of drawings, line 2, and in the heading to the printed specification, line 2, strike out "STATIC TESTING AND", each occurrence.

Signed and sealed this 24th day of April 1962.

(SEAL)
Attest:

ESTON G. JOHNSON
Attesting Officer

DAVID L. LADD
Commissioner of Patents